United States Patent [19]

Goto

[11] Patent Number: 4,914,324

[45] Date of Patent: Apr. 3, 1990

[54] CLAMPING CIRCUIT

[75] Inventor: Hiroshige Goto, Yokohama, Japan

[73] Assignee: Kabushiki Kaisha Toshiba, Tokyo, Japan

[21] Appl. No.: 225,816

[22] Filed: Jul. 29, 1988

[30] Foreign Application Priority Data

Jul. 31, 1987 [JP] Japan .................. 62-192070

[51] Int. Cl.$^4$ .............................................. H03K 5/08
[52] U.S. Cl. .................... 307/546; 307/555; 307/562; 307/359
[58] Field of Search ............... 307/359, 548, 555, 562, 307/546; 358/156, 163, 165, 167, 170, 172

[56] References Cited

U.S. PATENT DOCUMENTS 3,543,169 11/1970 Hill .
4,255,715 3/1981 Cooperman ................. 307/359
4,328,434 5/1982 Geller ........................ 307/359
4,513,321 4/1985 Olson .
4,742,392 5/1988 Hashimoto .

Primary Examiner—John Zazworsky
Attorney, Agent, or Firm—Foley & Lardner, Schwartz, Jeffery, Schwaab, Mack, Blumenthal & Evans

[57] ABSTRACT

A clamping circuit suitable for an image processing is disclosed. This clamping circuit includes a differential output circuit to which an input signal is applied, series-connected two MOS type gates circuits respectively having gate electrodes to which an output signal from the differential output circuit to be clamped and a reference voltage of a target value are applied, and reset circuit including a holding capacitor connected to the drain electrode side of either of the MOS type gate circuits to discharge charge in the holding capacitor at the time of beginning of clamping operation. The clamping circuit further includes a current source connected to the junction between the MOS type gate circuits, charge current flow control circuit for accumulating charge in the holding capacitor, and feedback circuit for feeding back a potential of the holding capacitor to the differential output circuit.

13 Claims, 3 Drawing Sheets

CLAMPING CIRCUIT

BACKGROUND OF THE INVENTION

This invention relates to a clamping circuit or a clamper suitable for image processing.

For setting an analog output level to a desired external set voltage as in the case of a reference black level for a charge coupled device (CCD) output, a clamping circuit is used.

In a typical prior art clamping circuit, two differential amplifiers are connected in a loop, and a holding capacitor is provided at the junction between the differential amplifiers.

Since a differential amplifier used in such a circuit is required to have a high gain, the circuit construction becomes complicated and the occupation area on a semiconductor device is also large, thereby preventing miniaturization of the device. In addition, overshoot is produced during the clamping operation because the differential amplifier has a high gain, so that the entire system is likely to become unstable. Depending upon circumstances, defective phenomena such as oscillation, etc. may occur.

SUMMARY OF THE INVENTION

Therefore, an object of this invention is to provide a clamping circuit which can have a small size because of a simple construction, and which can perform a stable operation.

In accordance with this invention, there is provided a clamping circuit comprising: a differential output circuit having an input terminal on one side thereof to which an input signal is applied; two MOS type gate circuits connected in series, an output signal from the differential output circuit to be clamped and a reference voltage which is a clamping target value being applied to gate electrodes of the MOS type gate circuits, respectively; reset means including a holiday capacitor connected to the drain side of either of the MOS type gate circuits to discharge charge in the holding capacitor at a time when a clamping operation is initiated; a current source connected to a junction between the MOS type gate circuits; charge current flow control means for accumulating current flowing to the junction in the holding capacitor; and feedback means for feeding back a potential of the holding capacitor to an input terminal on the other side of the differential output circuit.

In such a clamping circuit, the fact that charge moves toward a deeper side of potential wells below two MOS type gate circuits connected in series having gate electrodes to which an output from the differential output circuit and a reference voltage are input, respectively is utilized to provide a feedback of the charge, thus to hold the charge when the depths of the potential wells below both MOS type gate circuits are equal to each other. Thus, the circuit construction becomes simple. This is advantageous to miniaturization of a semiconductor device.

In addition, since the differential output circuit is not required to have high sensitivity, an unstable operation such as oscillation is eliminated.

DESCRIPTION OF THE PREFERRED EMBODIMENTS

Figure 1:
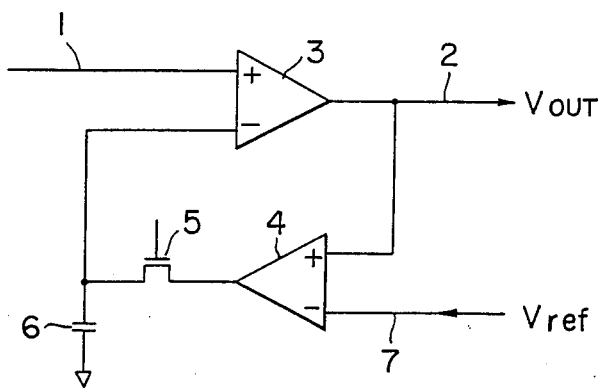
FIG. 1 is a circuit diagram of a conventional clamping circuit.

Prior to the description of this invention, an outline of the prior art will be described with reference to FIG. 1 showing a typical conventional clamping circuit.

This circuit includes two differential amplifiers 3 and 4 which are connected in a loop. A signal line 1 for transmitting a control signal is connected to the plus (+) side of the differential amplifier 3, and an output of the differential amplifier 4 is connected to the minus (−) side of the differential amplifier 3 through a switch 5 shown as a FET switch, and to a holding capacitor 6. An output line 2 of the differential amplifier 3 is connected to the plus (+) side of the differential amplifier 4, and a reference voltage $V_{ref}$ is inputted to the minus (−) side of the differential amplifier 4.

Figure 2:
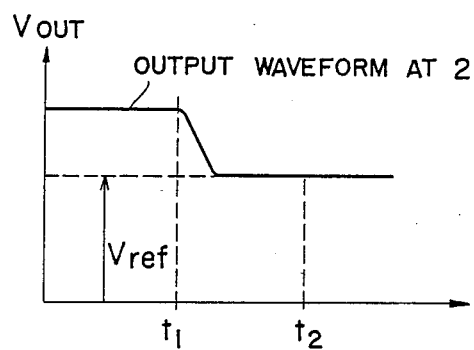
FIG. 2 is an output waveform diagram showing the operation of the conventional clamping circuit shown in FIG. 1.

The operation of the clamping circuit mentioned above will be described with reference to FIG. 2. For brevity of explanation, it is assumed in this example that an internal signal is a d.c. voltage.

When the switch 5 is turned on at time $t_1$, a difference between an output voltage $V_{out}$ and a reference voltage $V_{ref}$ is fed back to the differential amplifier 3. Thus, the output voltage $V_{out}$ of the differential amplifier is clamped to a definite voltage which is equal to the reference voltage $V_{ref}$ in this case. An output from the differential amplifier 4 at this time is held by the holding capacitor 6. Thus, the clamping state is maintained.

Since two differential amplifiers are used in this circuit, the circuit construction becomes bulky, thereby preventing miniaturization of the device. In addition, since the differential amplifiers used have a large gain, unstable operation such as oscillation is likely to occur.

Several embodiments according to this invention will now be described in detail with reference to the accompanying drawings.

Figure 3:
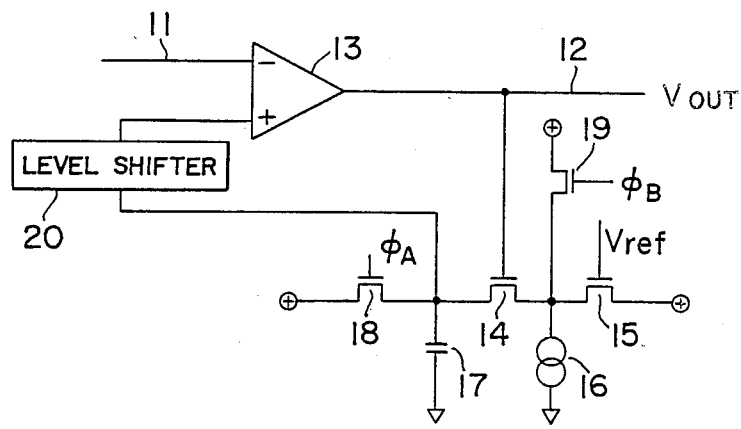
FIG. 3 is a circuit diagram showing an embodiment of a clamping circuit according to this invention.

In a circuit shown in FIG. 3, two MOS type gate circuits 14 and 15 are connected in series and a junction therebetween is connected a current source 16. An operation completion gate circuit 19 as an operation control means controlled by a pulse $\Phi_B$ is connected to the junction. An output line 12 of a differential amplifier 13 is connected to the gate electrode of the MOS type gate circuit 14. A reference voltage $V_{ref}$ is applied to the gate electrode of the MOS type gate circuit 15. In addition, a holding capacitor 17 and a reset gate circuit 18 controlled by a pulse $\Phi_A$ are connected on the drain electrode side of the MOS type gate circuit 14. The junction among the reset gate circuit 18, the MOS type gate circuit 14 and the holding capacitor 17 is connected to the plus (+) side input terminal of the differential amplifier 13, acting as an output circuit, through a level shifter 20 for making a level adjustment. It is to be noted that the MOS type gate circuits 14 and 15 have substantially the same construction and their characteristics are substantially the same.

Figure 4:
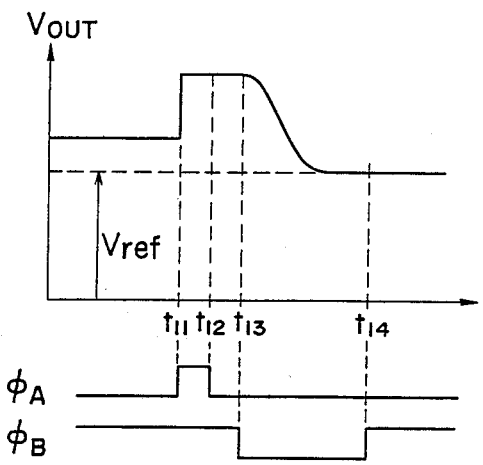
FIG. 4 is an output waveform diagram showing the operation of the clamping circuit shown in FIG. 3.

The operation of the circuit shown in FIG. 3 will be described with reference to FIG. 4 showing the waveforms of applied pulses $\Phi_A$ and $\Phi_B$, and the output waveform $V_{out}$. For brevity of description, it is here assumed that a d.c. voltage is applied to control signal line 11.

At time $t_{11}$, pulse $\Phi_A$ applied to the gate electrode of the reset gate circuit 18 builds up to a high value. For an interval up to the time $t_{12}$, the potential of the capacitor 17 is reset to the external drain voltage since the gate 18 is ON thus bringing the capacitor 17 to a floating state. At this time, pulse $\Phi_B$ applied to the gate electrode of the operation completion gate circuit 19 is maintained at a high level, e.g., 12 volts. When the voltage of the capacitor 17 is 12 volts, the output voltage $V_{out}$ is about 8 volts. When it is assumed that the reference voltage is 5 volts, current flows into the drain electrodes of MOS type gate circuits 14 and 15 via the operation completion gate circuit 19 because the potential well below the operation completion gate circuit 19 is the deepest. Since a setting can be made such that a relation $V_{out} > V_{ref}$ holds at the time of initiation of a comparison, a description will be made assuming such a relation.

Then, at time $t_{13}$, the pulse $\Phi_B$ goes low. Thus, the deepest potential well among those below the MOS type gates 14, 15, and 19 is that beneath the MOS type gate 14. The charges (electrons) from the current source flow into the holding capacitor 17 passing under the gate 14 and thus the potential of the capacitor 17 will decrease gradually from 12 volts. This variation of the capacitor 17 is fed back to the gate of the MOS circuit 14 through the level shifter 20 and the plus side terminal of the differential amplifier 13. As long as the output $V_{out}$ of the differential amplifier 13 is larger than $V_{ref}$, feedback action is continued so that $V_{out}$ is decreased. Such a feedback is stopped when a relation $V_{out} = V_{ref}$ holds, i.e., the depths of the potential wells below the MOS gate circuits 14 and 15 are substantially equal to each other thus manifesting an equilibrium state. Since the above described action occurs irrespective of the quantity of charge in the holding capacitor, as a principle, the differential amplifier 13 is not required to have any gain.

After reaching this equilibrium state, the charge from the current source 16 flows into the drain via the potential well below the MOS type gate circuit 15. Thus, clamping operation is completed. Thereafter, when the pulse $\Phi_B$ builds up to the high level at time $t_{14}$, the charge flows to the drain electrodes of MOS type gate circuits 14 and 15 via the operation completion gate circuit 19, so that no change in the holding capacitor 17 occurs even if any change in $V_{out}$ occurs. Thus, stable clamping operation is ensured. This clamping operation has a speed on the order of 10 $\mu$s.

As previously described, the feedback operation is conducted only when the relation $V_{out} > V_{ref}$ holds. Any feedback operation is not caused under the condition of $V_{out} \leq V_{ref}$, so that any oscillation is not produced.

It is to be noted that, strictly speaking, the point at which flow of the charge is stopped is not the point where the relationship of $V_{out} = V_{ref}$ holds, but has an error as described below. Namely, as described above, the charges in the holding capacitor will not flow when all the charges from the current source flow to the drain electrode through the potential well below the MOS gate circuit 15. Denoting the width and the length of the gate electrode of the MOS type gate circuit 15 by W and L, respectively, the ratio therebetween is expressed by W/L, and when the modulation factor of the potential well and a current value of the current source are denoted by m and I, respectively, the relationship holds:

$$I = A \cdot (W/L) \cdot (m\Delta V)^2$$

where A is a constant. When $V_{out}$ is reduced by $\Delta V$, viz., when the following equation holds, the flow of the charge will be stopped:

$$V_{out} = V_{ref} - \Delta V.$$

An error $\Delta V$ in this case is expressed as follows:

$$\Delta V = 1/m \sqrt{1/A(W/L)} .$$

An actual stop point is shifted by this error $\Delta V$.

To reduce such an error to a value permissible to the system, it is sufficient to set I to a small value and W/L to a large value.

Figure 5:
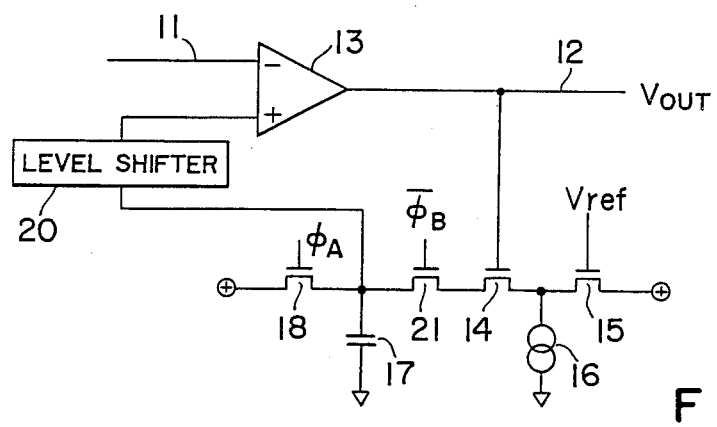
FIG. 5 is a circuit diagram showing a modification of the clamping circuit shown in FIG. 3.

FIG. 5 shows a modification of FIG. 3 wherein the charge flowing into the holding capacitor 17 is controlled by the operation completion gate circuit 21 on-off controlled by pulse $\overline{\Phi}_B$. Namely, when the operation completion gate circuit 21 is turned on even in a case wherein the potential well directly below the MOS type gate circuit 14 is deeper than the potential well directly below the MOS gate circuit 15, the comparison operation is completed. A clamping value corresponding to the charge in holding capacitor at that time will be outputted.

Figure 6:
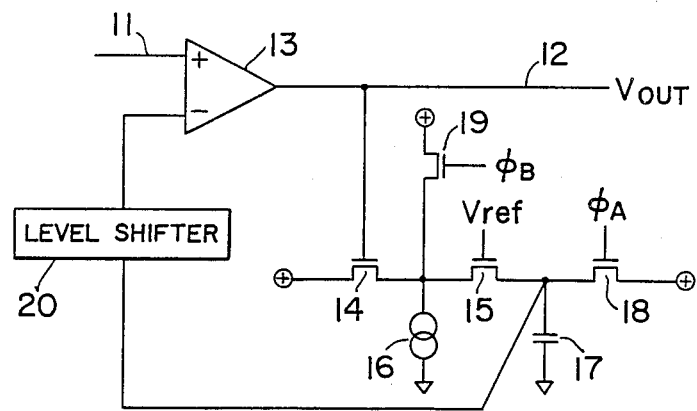
FIG. 6 is a circuit diagram showing another embodiment of a clamping circuit according to this invention.

FIG. 6 is a circuit diagram showing another embodiment of this invention.

In this figure, the connection relationship of the MOS type gate circuits 14 and 15, the constant current source 16, and the operation completion gate 19 is the same as that in the case shown in FIG. 3. This embodiment differs from that shown in FIG. 3 in that MOS type gate circuit 15 having a gate electrode to which a reference voltage is applied and a reset gate circuit 18 are connected in series, and holding capacitor 17 and level shifter 20 connected to the minus (−) side of the output differential amplifier 13 are connected to the junction between gate circuits 15 and 18 and that a control signal is applied to the plus (+) side of the differential amplifier 13.

Figure 7:
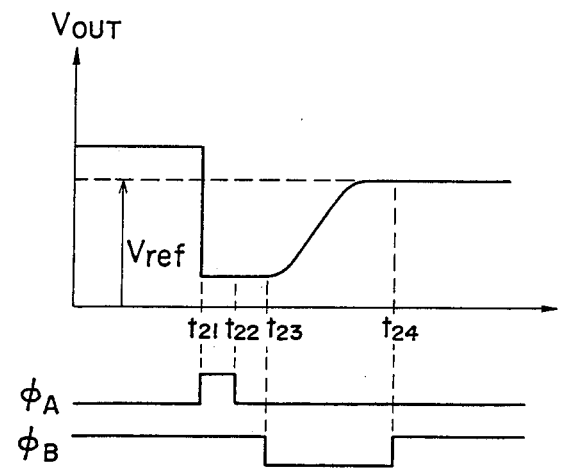
FIG. 7 is an output waveform diagram showing the operation of the clamping circuit shown in FIG. 6.

FIG. 7 is a waveform diagram showing the clamping operation of the circuit shown in FIG. 6.

Before time $t_{21}$, the holding capacitor 17 is in a charge accumulated state. Since a voltage corresponding to the charge is applied to the minus (−) side of the differential amplifier 13, the output voltage $V_{out}$ is maintained at a potential higher than $V_{ref}$. During an interval between time $t_{21}$ and $t_{22}$, when reset pulse $\Phi_A$ is applied to the reset gate circuit 18, the charge flows into the drain electrode of gate circuit 14 via gate circuit 15. Thus, the potential of $V_{out}$ is rapidly lowered, resulting in a state where the relation $V_{out} < V_{ref}$ holds.

Assuming now that the pulse $\Phi_B$ applied to the operation completion gate circuit 19 builds down to a low level at time $t_{23}$, the junction between the MOS type gate circuits 14 and 15 is brought into a floating state.

Because the relation $V_{out} < V_{ref}$ holds as described above, so that charge flows into the holding capacitor 17 via the well below the MOS gate circuit 15, thus lowering its potential. Since this potential is applied to the minus (−) side of the differential amplifier 13 through the level shifter 20, the output $V_{out}$ gradually increases. The increase of the output $V_{out}$ is stopped at the time when an equation $V_{out} = V_{ref}$ holds. By the the charge in the holding capacitor at this time, the output voltage $V_{out}$ is kept at a fixed value.

Also in this case, the circuit becomes operative only when the output is lower than $V_{ref}$. Thus, the possibility of oscillation, etc. is completely eliminated.

Figure 8:
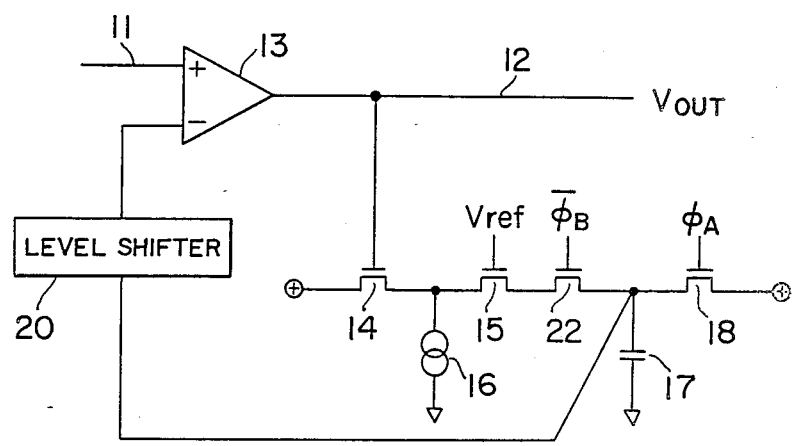
FIG. 8 is a circuit diagram showing a modification of the clamping circuit in FIG. 6.

FIG. 8 is a circuit diagram showing another modification of the embodiment shown in FIG. 6. In this embodiment, an operation completion gate circuit 22 controlled by pulse $\bar{\Phi}_B$ is serially inserted between MOS type gate circuits 15 and the holding capacitor 17. Only when the operation completion gate circuit 22 is in an ON state, comparison between an output $V_{out}$ and a reference voltage $V_{ref}$ is made.

As just described, the operation completion gate circuit 22 is required only to control the charge flowing into the holding capacitor 17. For this reason, as shown in FIGS. 5 and 8, the operation completion gate circuit 22 can be connected between one of two MOS type gate circuits 14 and 15 and the holding capacitor 17, so that, excellent operation can be performed.

In addition, by giving a value nearly equal to the clamping value of the holding capacitor to a drain electrode of the MOS type gate circuit 15 for application of a reference voltage in the arrangements shown in FIGS. 3 and 5, a high speed operation can be realized.

While a reference voltage applied to one of MOS type gate circuits employs a target value as it is in the above-mentioned embodiments, a voltage expresses as $(V_{ref} - \Delta V)$ may be used as a reference voltage by taking an error in operation into account, thus making it possible to further improve the clamping accuracy.

What is claimed is:

1. A clamping circuit comprising:
    a differential output circuit having first and second input terminals, an input signal being applied to said first input terminal;
    two MOS type gate circuits connected in series, means for applying an output signal from said differential output circuit to be clamped and a reference voltage which is a clamping target value to respective gate electrodes of said MOS type gate circuits, respectively;
    a holding capacitor connected to a drain side of one of said MOS type gate circuits;
    reset means for resetting a potential of said holding capacitor at a time when a clamping operation is initiated;
    a current source connected to a junction between said MOS type gate circuits;
    charge current flow control means for controlling current flowing between said junction and said holding capacitor to selectively prevent current from said current source from affecting the potential on said capacitor; and
    feedback means for feeding back a potential of said holding capacitor to said second input terminal of said differential output circuit.

2. A clamping circuit as set forth in claim 1, wherein said feedback means includes a level shifter for adjusting a level of said feedback potential.

3. A clamping circuit as set forth in claim 1, wherein said reference voltage is equal to a desired value of said output signal adjusted by an error voltage of said circuit.

4. A clamping circuit as set forth in claim 1, wherein said two MOS type gate circuits connected in series have the same construction.

5. A clamping circuit as set forth in claim 1, wherein said charge current flow control means comprises an operation completion MOS type gate circuit with its source electrode connected to said junction.

6. A clamping circuit as set forth in claim 1, wherein said charge current flow control means compries a MOS type gate circuit connected in series to said junction between said two MOS type gate circuits connected in series.

7. A clamping circuit as set forth in claim 1 wherein said charge current flow control means comprises a MOS gate circuit connected to said junction.

8. A clamping circuit comprising:
    a differential output circuit having a first input terminal to which an input signal is applied;
    two MOS type gate circuits connected in series, an output signal from said differential output circuit to be clamped and a reference voltage which is a clamping target value being applied to respective gate electrodes of said MOS type gate circuits;
    reset means including a holding capacitor connected to a drain side of either of said MOS type gate circuits to control a charge on said capacitor to obtain an output signal having a higher voltage than the reference voltage at a time when a clamping operation is initiated;
    a current source connected to a junction between said two MOS type gate circuits;
    operation control means for selectively inhibiting current from said current source from affecting the potential of said capacitor during operation of said reset means or permitting current from said current source to offset said potential on said capacitor in response to a comparison carried out by said two MOS type gate circuits during a clamping operation; and
    feedback means for feeding back a potential of said holding capacitor to a second input terminal of said differential output circuit until the output signal becomes equal to the reference value.

9. A clamping circuit as set forth in claim 8, wherein said feedback means includes a level shifter for adjusting the feedback potential.

10. A clamping circuit as set forth in claim 8, wherein said tow MOS type gate circuits connected in series have the same construction.

11. A clamping circuit as set forth in claim 8, wherein said operation control means comprises a MOS type gate circuit with its source electrode connected to said junction, and operates to prevent charges from said junction from flowing into the holding capacitor after completion of clamping.

12. A clamping circuit as set forth in claim 8, wherein said operation control means comprises a MOS type gate circuit connected in series to said junction between said two MOS type gate circuit connected in series.

13. A clamping circuit as set forth in claim 8, wherein said operation control means comprises a MOS type gate circuit connected to said junction.

* * * * *